US012734086B2

(12) United States Patent

Cai et al.

(10) Patent No.: US 12,734,086 B2

(45) Date of Patent: Sep. 15, 2026

(54) ELECTRIC NURSING BED WITH ROTATING AND BOOSTING FUNCTIONS

(71) Applicant: TFC Technology Co., Ltd., Jiaxing (CN)

(72) Inventors: Jun Cai, Jiaxing (CN); Weibin Fan, Jiaxing (CN); Kangming Tao, Jiaxing (CN)

(73) Assignee: TFC Technology Co., Ltd., Jiaxing (CN)

(*) Notice: Subject to any disclaimer, the term of this patent is extended or adjusted under 35 U.S.C. 154(b) by 0 days.

(21) Appl. No.: 19/390,739

(22) Filed: Nov. 17, 2025

(65) Prior Publication Data

US 2026/0069477 A1 Mar. 12, 2026

(30) Foreign Application Priority Data

Nov. 7, 2025 (CN) ........................ 202511623791.8

(51) Int. Cl.

| | |
|---|---|
| ***A61G 7/005*** | (2006.01) |
| ***A61G 7/015*** | (2006.01) |
| ***A61G 7/018*** | (2006.01) |
| ***A61G 7/05*** | (2006.01) |
| ***A61G 7/07*** | (2006.01) |
| ***A61G 7/075*** | (2006.01) |

(52) U.S. Cl.

CPC ............. *A61G 7/015* (2013.01); *A61G 7/005* (2013.01); *A61G 7/018* (2013.01); *A61G 7/0506* (2013.01); *A61G 7/07* (2013.01); *A61G 7/0755* (2013.01)

(58) Field of Classification Search

CPC ........ A61G 7/015; A61G 7/005; A61G 7/018; A61G 7/0506; A61G 7/07; A61G 7/0755; A61G 7/16

See application file for complete search history.

(56) References Cited

U.S. PATENT DOCUMENTS

| | | | |
|---|---|---|---|
| 2016/0270992 A1 | 9/2016 | Wang | |
| 2017/0258656 A1 | 9/2017 | Hashimoto | |
| 2021/0045950 A1* | 2/2021 | Connell ................ | A61G 7/002 |
| 2022/0096297 A1 | 3/2022 | Enai | |

* cited by examiner

*Primary Examiner* — Aaron R Eastman

(74) *Attorney, Agent, or Firm* — Hemisphere Law, PLLC

(57) ABSTRACT

An electric nursing bed with rotating and boosting functions is provided, including a bedstead assembly, a mounting frame, a rotating rod, a mattress foundation, an anti-skid frame, a first linear push rod, and a second linear push rod. The mattress foundation includes a back frame, a buttock frame, an upper leg frame, and a lower leg frame. The anti-skid frame is rotatably connected to the upper leg frame. The mounting frame is rotatably disposed on the bedstead assembly, so as to support the mattress foundation. The rotating rod is fastened to the buttock frame, simultaneously extends below the upper leg frame, and is hinged to the mounting frame.

8 Claims, 6 Drawing Sheets

ELECTRIC NURSING BED WITH ROTATING AND BOOSTING FUNCTIONS

TECHNICAL FIELD

The present disclosure relates to the field of medical auxiliary instruments, in particular to an electric nursing bed with rotating and boosting functions.

BACKGROUND

The rotary nursing bed can be switched among states of lying, sitting and getting off the bed, and is particularly convenient for a patient who is inconvenient to get up, go to the bed, and get off the bed, so that the working strength of nursing personnel can be greatly reduced.

For example, the Patent Publication No. CN116687684A discloses a rotary digestive medical patient care bed, including a bedstead assembly and a bed board assembly rotatably mounted on the bedstead assembly. The bed board assembly includes a back support plate, a buttock support plate, an upper leg support plate, and a lower leg support plate that are successively hinged, and linear driving units are disposed between the buttock support plate and the back support plate, and between the buttock support plate and the upper leg support plate. A rotation driving unit is mounted on the bedstead assembly, and the buttock support plate is fixedly mounted at an output end of the rotation driving unit to implement angle adjustment.

The nursing bed may implement functions that the nursing bed is convenient to get off the bed in a lying position or a sitting position, or after the bed is rotated. There are also defects in the use of the nursing bed. 1. There is no boosting function. The nursing bed can only rotate an inconvenient user to a direction of getting off the bed. Some weak users may be strenuous during taking out of the bed. Nursing workers or other personnel may also be strenuous when helping the user getting off the bed. 2. There is no anti-sliding function. At the end of rotation, the body of the user may slide downward due to gravity and inertia. The user usually grasps the bed with hands to prevent the body from falling down, resulting in inconvenience to the user and potential safety risks.

SUMMARY

Aiming at the defects in the prior art, the present disclosure provides an electric nursing bed with rotating and boosting functions, so that convenience and safety of a user in getting off the bed can be significantly improved.

In order to achieve the forgoing purpose, the present disclosure provides the following technical solution.

An electric nursing bed with rotating and boosting functions includes a bedstead assembly, a mounting frame, a rotation driving unit, a rotating rod, a mattress foundation, an anti-skid frame, a first linear push rod, and a second linear push rod; where

- the mattress foundation includes a back frame, a buttock frame, an upper leg frame, and a lower leg frame that are successively hinged;
- a head of the anti-skid frame is rotatably connected to a head of the upper leg frame, and a tail of the anti-skid frame is able to rotate up and down;
- the mounting frame is mounted on the bedstead assembly by using the rotation driving unit, so as to support the mattress foundation;
- a head of the rotating rod is fastened to a tail of the buttock frame, and a tail of the rotating rod extends below the upper leg frame and is hinged to the mounting frame;
- a limit frame is disposed on a head of the buttock frame, a connecting seat that passes through the limit frame is disposed on a tail of the back frame, the first linear push rod is disposed between the mounting frame and the connecting seat, and has one-section extension and two-section extension, when one-section extension is performed on the first linear push rod, the connecting seat drives the back frame to rotate upward relative to the buttock frame while swinging in the limit frame, and when two-section extension is performed on the first linear push rod, the connecting seat jacks up the limit frame, so as to drive the buttock frame and the upper leg frame to tilt forward; and
- a rotating shaft structure is disposed on a tail of the mounting frame, a swing arm and a top wheel are connected to the rotating shaft structure, one end that is of the swing arm and that is away from the rotating shaft structure extends in a bed tail direction and is in sliding fit with a sliding chute of the lower leg frame, the second linear push rod is disposed between the mounting frame and the rotating shaft structure, with contraction of the second linear push rod, the rotating shaft structure is driven to rotate, so that the swing arm rotates downward to drive the tail of the lower leg frame to rotate downward and simultaneously drive the top wheel to rotate upward, and the tail of the anti-skid frame is jacked up.

Preferably, the bedstead assembly includes a bed beam, and a headboard assembly and a footboard assembly that are disposed on both ends of the bed beam.

Preferably, the rotation driving unit includes a fixing sleeve, a rotating sleeve, a rotating disc, and a third linear push rod;

- the fixing sleeve is fastened to the bedstead assembly in a vertical state;
- the rotating sleeve is fitted in the fixing sleeve, the mounting frame is connected to a top of the rotating sleeve, the rotating disc is connected to a lower end of the rotating sleeve, and a driving frame is connected to the rotating disc; and
- a tail of a base of the third linear push rod is hinged to the bedstead assembly, and a piston rod of the third linear push rod is hinged to the driving frame.

Preferably, the buttock frame, the tail of the back frame, and the head of the upper leg frame are supported on the mounting frame, and a support beam for supporting the head of the back frame and the tail of the lower leg frame is disposed on the bedstead assembly.

Preferably, the limit frame is a frame of a U-shaped structure, a U-shaped port side of the limit frame is fastened to a head position of the buttock frame, the connecting seat includes two parallel boards, heads of the two boards are fastened to the tail of the back frame, tail ends of the boards are hinged to a piston rod of the first linear push rod after passing through the limit frame, and a motor base of the first linear push rod is hinged to a tail position of the mounting frame.

Preferably, the rotating shaft structure includes a first shaft body and a second shaft body that are arranged axially, a hinged plate is disposed on one end that is of the first shaft body and that faces the second shaft body, a piston rod of the second linear push rod is connected to the two hinged plates, and a motor base of the second linear push rod is hinged to the head of the mounting frame.

Preferably, a roller is connected to one end that is of the swing arm and that is away from the rotating shaft structure, a connecting plate is disposed below the lower leg frame, and the sliding chute is disposed on the connecting plate.

Preferably, armrest frames are disposed on both sides of the buttock frame.

The present disclosure has the following advantages. The rotation driving unit drives the mattress foundation to rotate in a direction that is convenient for the user to get off the bed, the second linear push rod drives the lower leg frame to swing downward and close to lower parts of the upper leg frame and the buttock frame. In addition, the top wheel rotates upward against the tail of the anti-skid frame, which may support leg positions of the user to play an anti-skid role. The first linear push rod drives the buttock frame and the lower leg frame to tilt forward, so that the user is convenient to get off the bed.

DETAILED DESCRIPTION OF THE EMBODIMENTS

Figure 1:
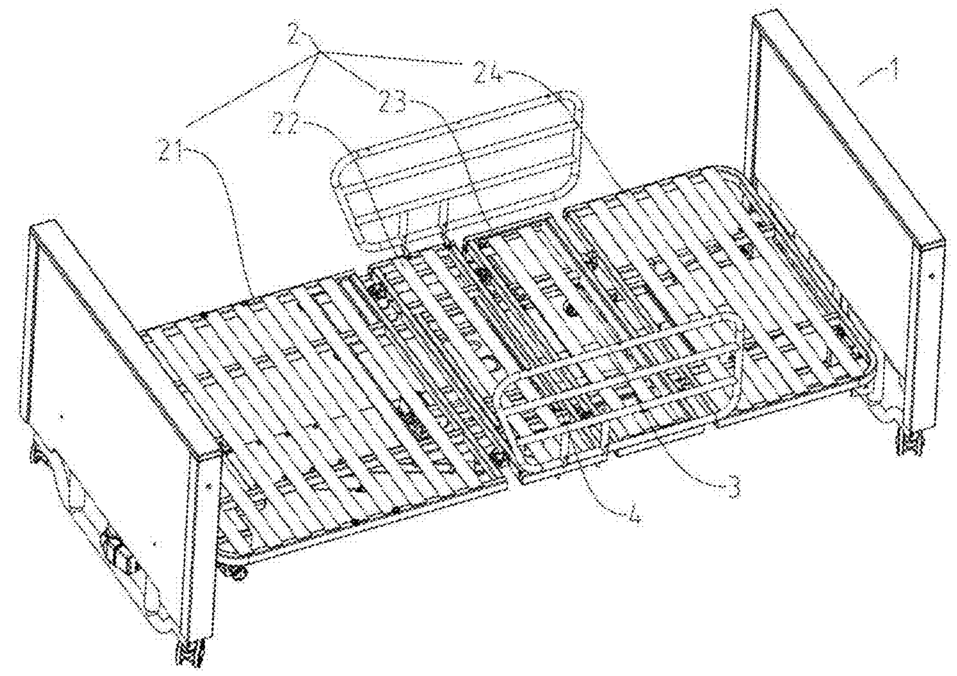
FIG. 1 is a schematic diagram of an electric nursing bed with rotating and boosting functions when lying according to the embodiment.
Figure 2:
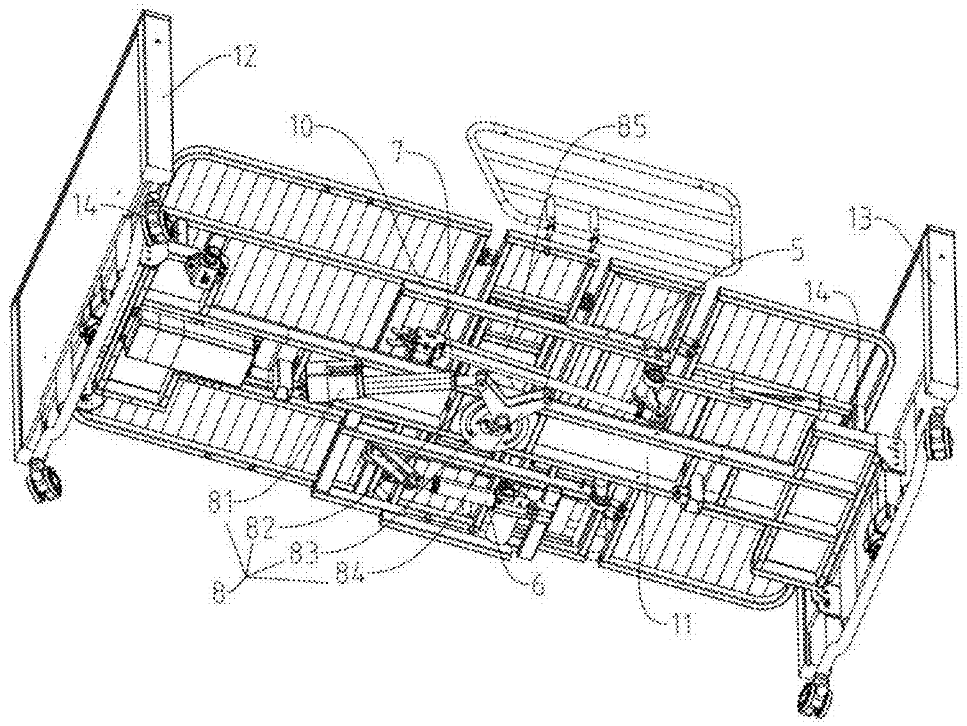
FIG. 2 is a schematic diagram of a bed bottom of an electric nursing bed with rotating and boosting functions when lying according to the embodiment.
Figure 3:
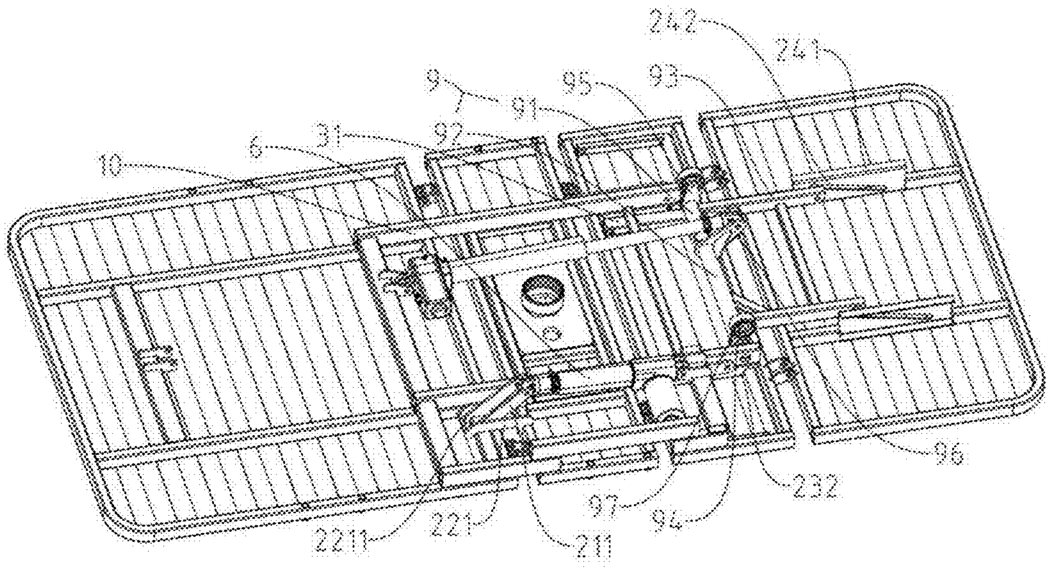
FIG. 3 is another schematic diagram of a bed bottom of an electric nursing bed with rotating and boosting functions when lying according to the embodiment.

An electric nursing bed with rotating and boosting functions is further described with reference to FIG. 1 to FIG. 6.

An electric nursing bed with rotating and boosting functions includes a bedstead assembly 1, a mounting frame 10, a rotation driving unit 8, a rotating rod 5, a mattress foundation 2, an anti-skid frame 3, a first linear push rod 6, and a second linear push rod 7.

The mattress foundation 2 includes a back frame 21, a buttock frame 22, an upper leg frame 23, and a lower leg frame 24 that are successively hinged by using a U-shaped plate. A head of the anti-skid frame 3 is rotatably connected to a head position of the upper leg frame 23, and a tail of the anti-skid frame 3 is able to swing up and down. The head and the tail refer to sides corresponding to a bed head and a bed tail of the nursing bed, respectively. The mounting frame 10 is mounted on the bedstead assembly 1 by using the rotation driving unit 8, so as to support the mattress foundation 2. There are two rotating rods 5. Heads of the two rotating rods 5 are fastened to a tail of the buttock frame 22, and tails of the rotating rods extend below the upper leg frame 23 and are hinged to left and right side walls of the mounting frame 10.

A limit frame 221 is disposed on a head of the buttock frame 22, that is, on the side corresponding to the bed head. A connecting seat 211 that passes through the limit frame 221 is disposed on a tail of the back frame 21, that is on the side corresponding to the bed tail. The first linear push rod 6 is disposed between the mounting frame 10 and the connecting seat 211, and has one-section extension and two-section extension. When one-section extension is performed on the first linear push rod 6, the connecting seat 211 drives the back frame 21 to rotate upward relative to the buttock frame 22 while swinging in the limit frame 221. When two-section extension is performed on the first linear push rod 6, the connecting seat 211 jacks up the limit frame 211, so as to drive the buttock 22 and the upper leg frame 23 to tilt forward; and facilitate the user to get off the bed.

A rotating shaft structure is disposed on a tail of the mounting frame 10. A swing arm 93 and a top wheel 94 are connected to the rotating shaft structure 9. One end that is of the swing arm 93 and that is away from the rotating shaft structure 9 extends in a bed tail direction and is in sliding fit with a sliding chute 242 of the lower leg frame 24. The second linear push rod 7 is disposed between the mounting frame 10 and the rotating shaft structure 9. With contraction of the second linear push rod 7, the rotating shaft structure 9 is driven to rotate, so that the swing arm 93 rotates downward to drive the tail of the lower leg frame 24 to rotate downward so that lower legs of the user may be pout down and simultaneously drive the top wheel 94 to rotate upward, and the tail of the anti-skid frame 3 is jacked up so as to support legs of the user for skid resistance.

A structure of the bedstead assembly 1 includes a bed beam 11 that extends back and forth, and a headboard assembly 12 and a footboard assembly 13 that are disposed on both ends of the bed beam 11, and plays a general support role.

A structure of the rotation driving unit 8 includes a fixing sleeve 82, a rotating sleeve and a third linear push rod 81.

The fixing sleeve 82 is fastened to a middle position of the bed beam 11 in a vertical state by using bolts. The rotating sleeve is fitted in the fixing sleeve 82 by using upper and lower bearings, and the lower bearing is a planar bearing. A fixed plate 85 is connected to the top of the rotating sleeve. The fixed plate is welded to the mounting frame 10 or is fastened by using bolts. A rotating disc 83 is connected to a lower end of the rotating sleeve by using bolts. The rotating disc 83 is located on a lower outer side of the fixing sleeve 82, and a driving frame 84 is connected to an edge position of the rotating disc 83. A tail of a motor base of the third linear push rod 81 is hinged to a lower surface of the bed beam 11 by using a U-shaped hinged seat, and a piston rod of the third linear push rod 81 is hinged to the driving frame 84. By means of extension and contraction of the third linear push rod 81, the rotating sleeve and the mattress foundation 2 may be driven to rotate by 90° back and forth.

The driving frame 84 includes a sleeve fastened to the rotating disc 83 in a vertical state and two hinged plates sleeved on the sleeve, and a piston rod of the third linear push rod 81 is hinged between the two hinged plates.

In this embodiment, when the rotation driving unit 8 is selected, a rotation driving structure in the prior art may also be used, for example, a rotating table may be directly purchased.

When the electric bed is in a lying state, the buttock frame 22, the tail of the back frame 21, and the head of the upper leg frame 23 are supported on the mounting frame 10, and a support beam 14 for supporting the head of the back frame 21 and the tail of the lower leg frame 24 is disposed on the bed beam 11 the bedstead assembly 1, so that the back frame 21, the buttock frame 22, the upper leg frame 23, and the lower leg frame 24 are integrally stably supported.

The limit frame 221 is a frame of a U-shaped structure. A U-shaped port side of the limit frame 221 is fastened to a position of a head side of the buttock frame 22 in a welded manner, and a closed side of the limit frame 221 extends in a direction of the bed head. The connecting seat 211 includes two parallel boards. Heads of the two boards are fastened to a tail side of the back frame 21. Tail ends of the two boards are hinged to a piston rod of the first linear push rod 6 after passing through the limit frame 221. A motor base of the first linear push rod 6 is hinged to a tail position of the mounting frame 10. Within a one-section extension range of the first linear push rod 6, rotation of the boards does not interfere with the limit frame 221. When the extension amount of the first linear push rod 6 is greater than the one-section extension range, the boards abut against a closed end 2211 of the limit frame 221, so that the limit frame 221 and the buttock frame may be driven to operate synchronously.

The rotating shaft structure 9 includes a first shaft body 91 and a second shaft body 92 that are arranged axially. One end that is of the first shaft body 91 and that is opposite to the second shaft body 92 is connected to left and right sides of the mounting frame 10 by using pin rolls. A hinged plate 96 is disposed on one end that is of the first shaft body 91 and that faces the second shaft body 92. A piston rod of the second linear push rod is connected to the two hinged plates by using pin rolls. A motor base of the second linear push rod 7 is hinged to the head of the mounting frame 10. Under the structure, the second linear push rod 7 drives the rotating shaft structure 9 to rotate, and the piston rod does not interfere with the first shaft body 91 and the second shaft body 92.

There are two swing arms 93, which are respectively fastened to the first shaft body 91 and the second shaft body 92. One end that is of the swing arm 93 and that is away from the rotating shaft structure 9 extends toward the lower leg frame 24, and is connected to a roller. Two connecting plates 241 are disposed below the lower leg frame 24, and the sliding chute 242 is disposed on the connecting plate, so as to cooperate with the roller. When the second linear push rod 7 is contracted, the swing arm 93 is driven to swing down. In addition, the roller is adapted to slide in the sliding chute 242, so as to drive the tail of the lower leg frame 24 to rotate downward.

Top plates 97 are fastened to both the first shaft body 91 and the second shaft body 92, and the top wheel 94 is fastened to the top plate 97. An angle between the top plate and the swing arm 93 is about 90°. When the second linear push rod 7 drives the lower leg frame 24 to swing by 90°, the top wheel 94 starts to make contact with a rod body 31 that extends back and forth on the anti-skid frame 3. With continuous contraction of the second linear push rod 7, the lower leg frame 24 may continue to be closed. In addition, the top wheel 94 gradually jacks up the tail of the anti-skid frame 3, so that the anti-skid frame 3 is higher than an upper surface of the upper leg frame 23. It should be noted that when the top wheel 94 is not in contact with the anti-skid frame 3, the anti-skid frame 3 is supported on the support rod 232 in the upper leg frame 23, and the upper surface of the anti-skid frame 3 is flush with a frame surface of the upper leg frame 23.

Armrest frames 4 are inserted in both sides of the buttock frame 22, so as to facilitate to support the user.

During use, when the nursing bed is in a lying state, the first linear push rod 6 is in a contracted state, the second linear push rod 7 is in an extended state, the back frame 21, the buttock frame 22, the upper leg frame 23, and the lower leg frame 24 are all in a flat state, and are supported and located by the mounting frame and the support beam. The third linear push rod 81 is in a contracted state, so that the mattress foundation 2 is in a backward and backward extension state, so that the user may lie flat.

Figure 4:
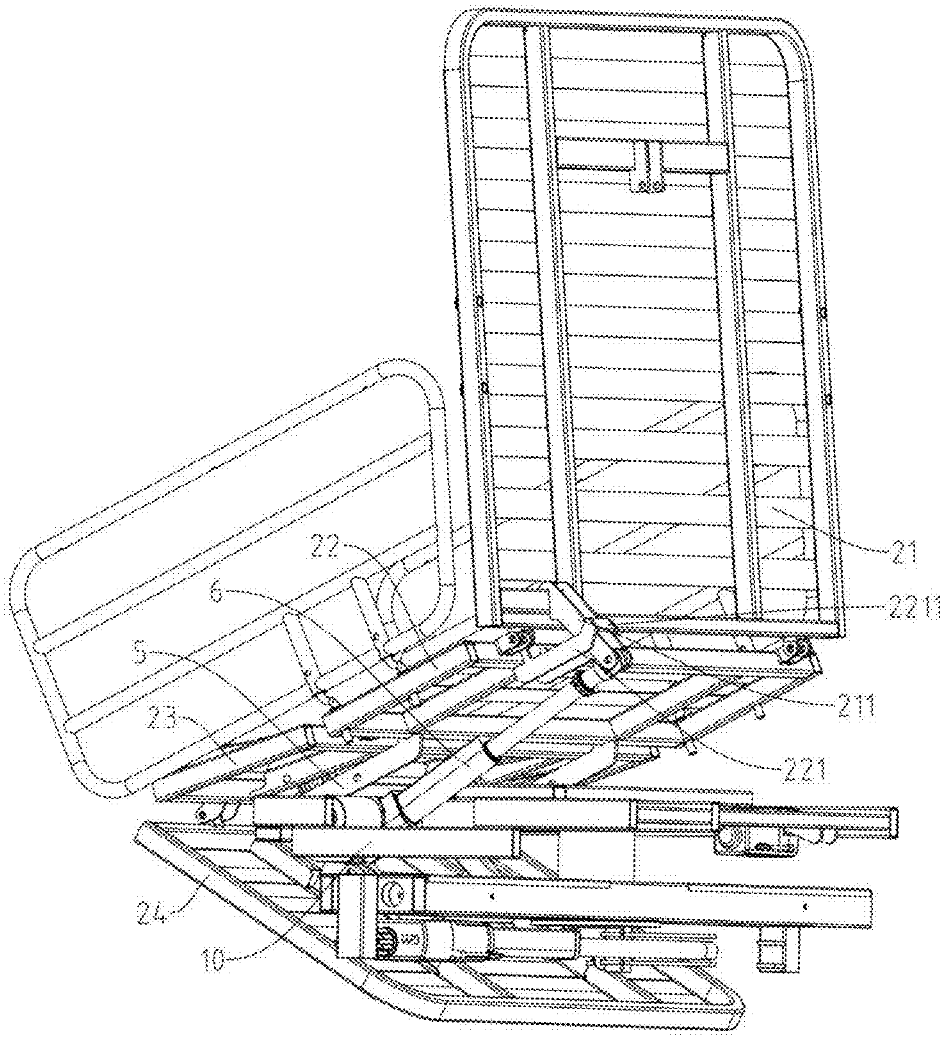
FIG. 4 is a schematic diagram of an electric nursing bed with rotating and boosting functions when boosting according to the embodiment.
Figure 5:
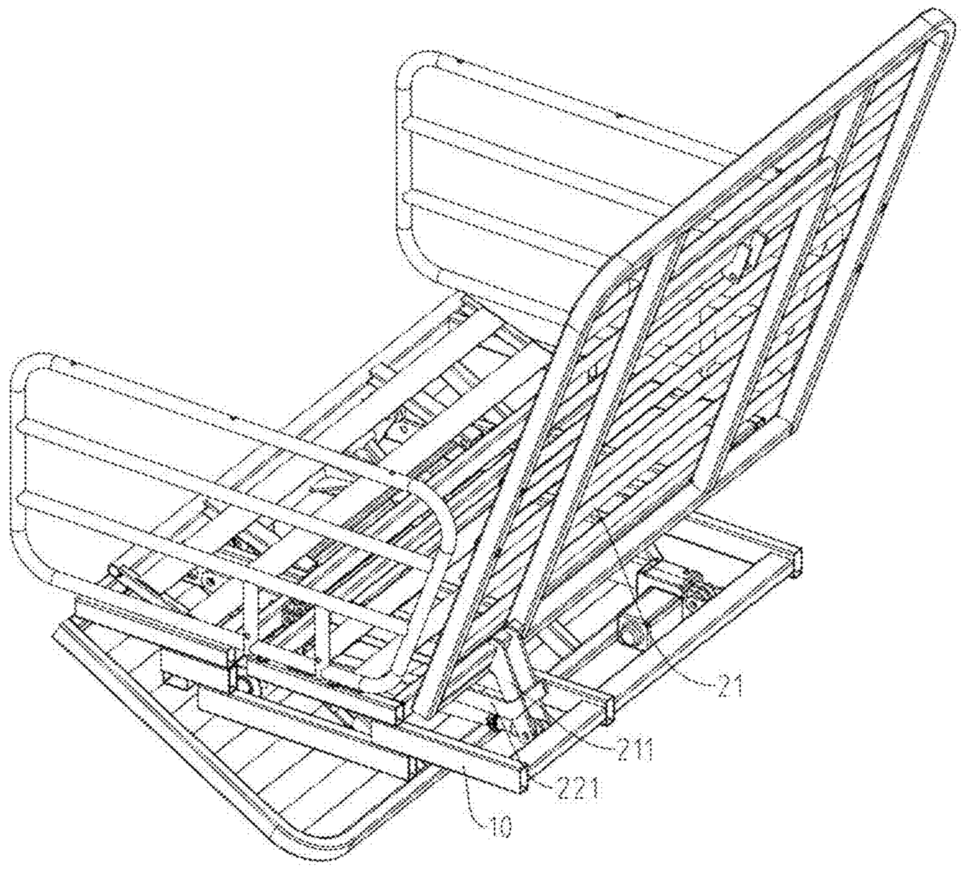
FIG. 5 is a schematic diagram of an electric nursing bed with rotating and boosting functions when sitting according to the embodiment.
Figure 6:
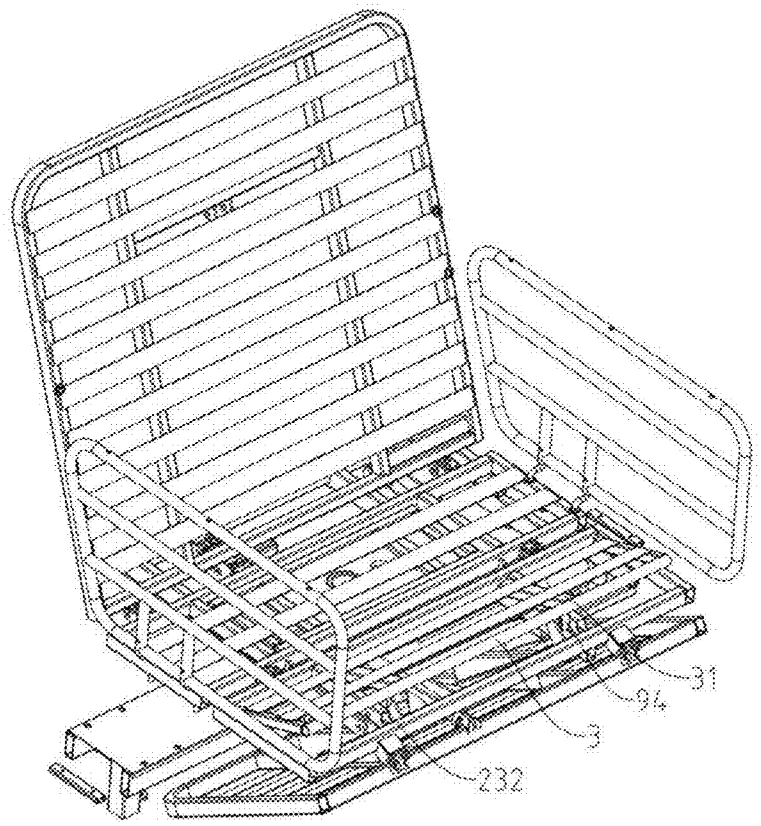
FIG. 6 is another schematic diagram of an electric nursing bed with rotating and boosting functions when sitting according to the embodiment.

When the user needs a sitting position, one-section extension of the first linear push rod 6 is shown in FIG. 4, so that the connecting seat 211 rotates in the limit frame 221, and the connecting seat 211 drives a tail side of the back frame 21 to rotate synchronously, so that a head side of the back frame 21 is jacked up, so that the user rests against the back.

When the user needs to get off the bed, the third linear push rod 81 extends, and drives the rotating sleeve to rotate by using the driving frame 84 and the rotating disc 83, so that the mattress foundation 2 in the sitting position gradually rotates by 90°. Then, the second linear push rod 7 is contracted, and drives the rotating shaft structure 9 to rotate, so that the tail of the swing arm 93 swings downward, so as to drive the tail of the lower leg frame 24 to gradually close down. In addition, the top wheel 94 on the rotating shaft structure 9 gradually rotates upward, and the tail of the anti-skid frame 3 is gradually jacked up, thereby supporting the legs of the user to play an anti-skid effect. Then, the first linear push rod 6 continues two-section extension on the basis of one-section extension, so that the connecting seat 211 jacks up the closed end 2211 of the limit frame 221 in synchronization with the buttock frame 22 and the rotating rod 5. The rotating rod 5 may be jacked up in synchronization with the leg frame 23. Therefore, the upper leg frame 23 and the buttock frame 22 may be in a forward tilt state, so as to facilitate the user to get off the bed. When the upper leg frame 23 and the buttock frame 22 are in a forward tilt state, the tail of the anti-skid frame 3 goes up to a platform, which can effectively play an anti-skid effect.

Unless otherwise specified, in the present disclosure, it needs to be illustrated that the indicative direction or position relations of the terms such as "width", "upper", "lower", "front", "back", "left", "right", "vertical", "horizontal", "top", "bottom", "inside", "outside", "clockwise", "anti-clockwise", "axial", "radial" and "circumferential" are direction or position relations illustrated based on the drawings, just for facilitating the description of the present disclosure and simplifying the description, but not for indicating or hinting that the indicated device or element must be in a specific direction and is constructed and operated in the specific direction, and therefore, the terms for describing the position relations in the drawings are used for illustrative description only, but cannot be understood as the restriction of the present disclosure. For ordinary skilled in the part, the specific meanings of the terms can be understood according to specific conditions in conjunction with accompanying drawings.

Except as otherwise noted, the terms such as "arrange", "link" and "connect" should be generally understood, for example, the components can be fixedly connected, and also can be detachably connected or integrally connected; and the components can be directly connected and also can be indirectly connected through an intermediate, and two components can be communicated internally. For those skilled in the art, the specific meanings of the terms in the present disclosure can be understood according to specific conditions.

The above mentioned is just the preferable embodiments of the present disclosure, the scope of protection of the present disclosure is not limited to the above embodiments, and the technical scheme in basically same means belongs to the scope of protection in the present disclosure. It should be noted that for those of ordinary skill in the art, several improvements and modifications may further be made without departing from the principle of the present disclosure.

What is claimed is:

1. An electric nursing bed with rotating and boosting functions, comprising a bedstead assembly, a mounting frame, a rotation driving unit, a rotating rod, a mattress foundation, an anti-skid frame, a first linear push rod, and a second linear push rod, wherein the mattress foundation comprises a back frame, a buttock frame, an upper leg frame, and a lower leg frame that are successively hinged;

a head of the anti-skid frame is rotatably connected to a head of the upper leg frame, and a tail of the anti-skid frame is able to rotate up and down;

the mounting frame is mounted on the bedstead assembly by using the rotation driving unit, so as to support the mattress foundation;

a head of the rotating rod is fastened to a tail of the buttock frame, and a tail of the rotating rod extends below the upper leg frame and is hinged to the mounting frame;

a limit frame is disposed on a head of the buttock frame, a connecting seat that passes through the limit frame is disposed on a tail of the back frame, the first linear push rod is disposed between the mounting frame and the connecting seat, and has one-section extension and two-section extension, when one-section extension is performed on the first linear push rod, the connecting seat drives the back frame to rotate upward relative to the buttock frame while swinging in the limit frame, and when two-section extension is performed on the first linear push rod, the connecting seat jacks up the limit frame, so as to drive the buttock frame and the upper leg frame to tilt forward; and a rotating shaft structure is disposed on a tail of the mounting frame, a swing arm and a top wheel are connected to the rotating shaft structure, one end that is of the swing arm and that is away from the rotating shaft structure extends in a bed tail direction and is in sliding fit with a sliding chute of the lower leg frame, the second linear push rod is disposed between the mounting frame and the rotating shaft structure, with contraction of the second linear push rod, the rotating shaft structure is driven to rotate, so that the swing arm rotates downward to drive the tail of the lower leg frame to rotate downward and simultaneously drive the top wheel to rotate upward, and the tail of the anti-skid frame is jacked up.

2. The electric nursing bed with rotating and boosting functions according to claim 1, wherein the bedstead assembly comprises a bed beam, and a headboard assembly and a footboard assembly that are disposed on both ends of the bed beam.

3. The electric nursing bed with rotating and boosting functions according to claim 1, wherein the rotation driving unit comprises a fixing sleeve, a rotating sleeve, a rotating disc, and a third linear push rod;

the fixing sleeve is fastened to the bedstead assembly in a vertical state;

the rotating sleeve is fitted in the fixing sleeve, the mounting frame is connected to a top of the rotating sleeve, the rotating disc is connected to a lower end of the rotating sleeve, and a driving frame is connected to the rotating disc; and a tail of a base of the third linear push rod is hinged to the bedstead assembly, and a piston rod of the third linear push rod is hinged to the driving frame.

4. The electric nursing bed with rotating and boosting functions according to claim 1, wherein the buttock frame, the tail of the back frame, and the head of the upper leg frame are supported on the mounting frame, and a support beam for supporting the head of the back frame and the tail of the lower leg frame is disposed on the bedstead assembly.

5. The electric nursing bed with rotating and boosting functions according to claim 1, wherein the limit frame is a frame of a U-shaped structure, a U-shaped port side of the limit frame is fastened to a head position of the buttock frame, the connecting seat comprises two parallel boards, heads of the two boards are fastened to the tail of the back frame, tail ends of the boards are hinged to a piston rod of the first linear push rod after passing through the limit frame, and a motor base of the first linear push rod is hinged to a tail position of the mounting frame.

6. The electric nursing bed with rotating and boosting functions according to claim 1, wherein the rotating shaft structure comprises a first shaft body and a second shaft body that are arranged axially, a hinged plate is disposed on one end that is of the first shaft body and that faces the second shaft body, a piston rod of the second linear push rod is connected to the two hinged plates, and a motor base of the second linear push rod is hinged to the head of the mounting frame.

7. The electric nursing bed with rotating and boosting functions according to claim 1, wherein a roller is connected to one end that is of the swing arm and that is away from the rotating shaft structure, a connecting plate is disposed below the lower leg frame, and the sliding chute is disposed on the connecting plate.

8. The electric nursing bed with rotating and boosting functions according to claim 1, wherein armrest frames are disposed on both sides of the buttock frame.

* * * * *